US010632485B2

(12) United States Patent
Fong

(10) Patent No.: US 10,632,485 B2
(45) Date of Patent: Apr. 28, 2020

(54) LIQUID DISPENSING SYSTEM AND APPARATUS

(71) Applicant: Karen Fong, Hawaiian Gardens, CA (US)

(72) Inventor: Karen Fong, Hawaiian Gardens, CA (US)

( * ) Notice: Subject to any disclaimer, the term of this patent is extended or adjusted under 35 U.S.C. 154(b) by 0 days.

(21) Appl. No.: 16/018,508

(22) Filed: Jun. 26, 2018

(65) Prior Publication Data

US 2019/0388919 A1 Dec. 26, 2019

(51) Int. Cl.
| | |
|---|---|
| *B05B 11/00* | (2006.01) |
| *A47K 5/12* | (2006.01) |
| *B05B 15/30* | (2018.01) |
| *B29C 65/00* | (2006.01) |

(52) U.S. Cl.
CPC ........ *B05B 11/3042* (2013.01); *A47K 5/1209* (2013.01); *B05B 11/0013* (2013.01); *B05B 11/0056* (2013.01); *B05B 11/0059* (2013.01); *B05B 11/3059* (2013.01); *B29C 66/542* (2013.01); *B05B 11/3074* (2013.01); *B05B 15/30* (2018.02)

(58) Field of Classification Search
CPC ............. B05B 11/0037; B05B 11/3042; B05B 11/3084; B05B 15/30; A47K 5/1205
USPC ........................................... 222/321.5, 424.5
See application file for complete search history.

(56) References Cited

U.S. PATENT DOCUMENTS

| | | | |
|---|---|---|---|
| 4,273,272 A | 6/1981 | Blanc | |
| 5,062,549 A * | 11/1991 | Smith | ................. B05B 11/0059 222/377 |
| 5,366,119 A * | 11/1994 | Kline | ..................... B05B 15/30 222/180 |
| 5,794,819 A | 8/1998 | Smith | |
| 5,839,614 A | 11/1998 | Brown | |
| 5,875,932 A | 3/1999 | Meshberg | |
| 9,439,551 B1 * | 9/2016 | Atkinson | ........... B65D 21/0209 |
| 2001/0030203 A1 * | 10/2001 | Weber | ................. B05B 11/0037 222/377 |
| 2001/0032864 A1 * | 10/2001 | Shepherd | ............ B05B 11/0037 222/321.5 |
| 2005/0092777 A1 * | 5/2005 | Wu | ........................ B05B 15/30 222/382 |
| 2011/0108580 A1 * | 5/2011 | Koh | ..................... B05B 11/0037 222/377 |
| 2012/0175382 A1 | 7/2012 | McAuley-Davis et al. | |

(Continued)

*Primary Examiner* — Ryan A Reis
(74) *Attorney, Agent, or Firm* — Omni Legal Group; Omid E. Khalifeh

(57) ABSTRACT

A liquid dispensing system and apparatus may comprise a container having a neck portion and a chamber portion, wherein the chamber portion is configured to retain a liquid and has at least one tapered portion. The system and apparatus may further comprise a base configured to secure the container and a dispensing member configured to securably mate with the neck portion and dispense liquid from the chamber portion. The base may removably secure the container or the container and the base may form one contiguous body. The dispensing member may have at least one dispenser head, at least one pump, and at least one dip tube configured to extend to the lowest point. In some embodiments, the tapered portion may be configured as an inverted hollow cone with the lowest point being the point of the cone.

2 Claims, 4 Drawing Sheets

(56) References Cited

U.S. PATENT DOCUMENTS

2016/0022096 A1* 1/2016 Kim ................ A47K 5/1205
  222/190
2016/0038959 A1* 2/2016 Lopez ............. B05B 11/3011
  222/135

* cited by examiner

LIQUID DISPENSING SYSTEM AND APPARATUS

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to liquid dispensing systems and apparatuses configured to maximize the amount of liquid that may be dispensed from a container without wasting any remnants of the liquid. More particularly, the disclosure relates to a liquid dispensing system and apparatus having a container with at least one tapered portion and at least one dip tube used to deliver liquid gathered at a lowest point of the tapered portion through a dispensing member.

BACKGROUND

Many liquids, such as soaps, creams, and lotions, utilize pump action dispensers. In such dispensers, a head piece unit attaches onto a container, wherein a liquid is retained. Generally, such containers have flat bottoms so as to stand upright. Head piece units usually, although not always, threadedly attach to the container, serving as a cap to seal the container as well as a pump to dispense liquid therefrom. Head piece units often have a dispensing head connected to a spring-powered vacuum, which is connected to a dip tube. To use the pump action dispenser, a user depresses the unit's head, which causes the spring(s) to contract, which, in turn, creates a suction force that draws the liquid up through the dip tube and out through the dispensing head. The dip tube can take a number of different forms and sizes, but commonly such tubes extend to at least the bottom of a container and sometimes, they are angled at their terminus to maximize their contact with the liquid.

Inevitably, however, liquid in the container will decrease to a level which is not siphonable by the dip tubes. Because such containers generally have a flat bottom, the dip tube fails to interact with the liquid either around the dip tube or on the other side of the container's bottom, if the tube's terminus is angled. Indeed, with normal containers and dispensing units, gravity causes the liquid to disperse evenly across the container's bottom, and the dip tube cannot contact it all. A need therefore exists for a container configured to permit the dip tube to reach all of the liquid retained therein, while remaining stabilized in an upright position.

Solutions to meet this need have been attempted. For example, U.S. Pat. No. 5,875,932, incorporated by reference in its entirety herein, discloses a modular dispensing system wherein, in some embodiments, the container's bottom provides for slightly tapered walls. While this disclosure does provide for interchangeability and slightly tapered container walls, much steeper tapering is necessary to enable the dip tube to contact the full quantity of the liquid.

Another attempt to meet this need may be found with respect to U.S. Pat. No. 4,273,272, incorporated by reference in its entirety herein, which teaches a dispensing system wherein the dip tube has a weighted terminus. This disclosure provides for a dip tube that can be positioned such that gravity may draw the dip tube towards one side of the container or the other so as to make contact with more of the liquid gathered at the container's bottom. However, this requires that the user tilt, tip or otherwise excessively maneuver the container, which can affect the user's ability to use the container in certain circumstances.

Yet another attempt can be seen with respect to U.S. Pat. No. 5,839,614, incorporated by reference in its entirety herein, which generally discloses a soap dispensing bag that utilizes gravity to fully dispense the soap. While this disclosure is indeed designed to entirely dispense the soap, and it does not require manipulation to do so, it suffers from its incomptability with standard pump action liquid dispensing systems, which dispense the liquid using the top-mounted pump action dispensing system generally described above.

Moreover, U.S. Patent Application Publication No. 2012/0175382, incorporated by reference in its entirety herein, discloses a two-piece dispenser. While this disclosure does enable a user to separate the top portion and more easily access the lower portion, presumably where the remainder of the liquid may be, it fails to provide for a way that enables a user to access this remainder via the pump dispenser top.

Finally, U.S. Pat. No. 5,794,819, incorporated by reference in its entirety herein, generally teaches a dual-compartment bottle system having a base with tapered edges. This disclosure provides for sloped edges of the bottom portion, thereby causing the liquid to collect somewhat towards the center of the base. However, this set up fails to fully direct the liquid to a point of suction from the dip tube.

As can be seen, no solution in existence comprises the beneficial characteristics described in the following disclosure. Thus, there remains a need for a new liquid dispensing system and apparatus allowing users to dispense the full amount of liquid retained in a container without undue maneuvering or frustration.

SUMMARY

The present disclosure is directed to a liquid dispensing system and apparatus configured to fully dispense a liquid, through utilization of a container having at least one tapered portion and at least one dip tube, thereby functioning with gravity to direct substantially all of the liquid from the container through a dispensing member.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In some embodiments, the present invention may comprise a liquid dispensing system and apparatus, wherein a container, which may be configured to retain a liquid, may have a neck portion that may have at least one opening and a chamber portion that may have at least one tapered portion, and wherein the tapered portion may be configured to terminate in a lowest point. The present invention may further comprise a dispensing member that may be configured to securably mate with the neck portion and may have at least one dispenser head, at least one pump, and at least one dip tube that may be configured to extend to the lowest point so as to collect liquid therefrom; and a base that may be configured to secure the container.

In certain embodiments, the tapered portion may be configured as an inverted hollow cone. In other embodiments, the tapered portion may be configured as a cylinder. In yet other embodiments, the tapered portion may be formed into other shapes capable of conveniently collecting liquid at the lowest point. Moreover, in certain embodiments, the container and the base may form one contiguous portion. In other embodiments, the base may be configured to removably secure the container. In such embodiments, the base may further comprise an upper surface and a bottom surface. The upper surface may be configured as the negative of the tapered portion of the chamber portion, while the bottom surface may be configured to provide support for the container on a surface. The upper surface may further comprise at least one fitting means configured to removably secure the container, such as one or more threaded elements or one or more friction-based snap-connect elements.

Additionally, in some embodiments, the base may be configured to support the container in an upright position on a flat surface. In such embodiments, the bottom surface may have one or more legs. In alternate embodiments, the bottom surface may be flat so as to directly contact a horizontal surface, such as a countertop. In other embodiments, the base may be configured to support the container in an upright position along a vertical surface and may further comprise mounting means, such as a supportive arm or suction cups.

In certain embodiments, the neck portion may have one or more mating elements, such as one or more threaded elements or one or more friction-based snap-connect elements. In such embodiments, the dispensing member may securably mate with the neck portion by engaging with the mating elements. In such embodiments, an interior side of the dispensing member may have one or more mating elements configured to engage with the mating elements of the neck portion. In some embodiments, the dispensing member may rest on or around the neck portion. In other embodiments, the dispensing member may be sealed to the neck portion.

In some embodiments, the dispensing member may comprise a standard or commercially produced pump action dispenser. The dispensing member may provide for the dip tube which may be configured to extent through the opening of the neck portion and into the chamber portion to a sufficient length so as to reach the lowest point. The dip tube may be defined as a hollow cylinder with two open termini, that is, an upper terminus and a lower terminus. In other embodiments, the dip tube may be defined as other hollow shapes with two open termini. The lower terminus may extend toward the lowest point. In some embodiments, the lower terminus makes contact with the lowest point. The lower terminus may be angled or otherwise configured to maximize its ability to make contact with and collect the liquid retained in the lowest point.

The dispensing member may further provide for the pump and the dispenser head. The dispenser head may be configured to control dispensing of liquid from the container. In some embodiments, the dispenser head may further comprise a nozzle which may be configured to deliver liquid as a spray, pool, or single shot, as desired. The liquid may be of a gel, spa, lotion, cream, or any other composition. The pump may be configured to draw liquid into the lower terminus of the dip tube up through the upper terminus of the dip tube and ultimately, dispense the liquid through the dispenser head. The pump may be any device capable of being inserted into the dispensing member and, when depressed, capable of dispensing liquid through the dispenser head. The pump may further comprise a pump actuation block which may prevent delivery of the liquid by blocking actuation of the dispenser head, thereby preventing inadvertent release or spills of liquid.

In certain embodiments, the neck portion may have exactly one opening and the chamber portion may be defined as exactly one compartment. In other embodiments, the neck portion may comprise two openings, that is, a first opening and a second opening. In such embodiments, the chamber portion may have a corresponding first compartment and second compartment. The first compartment and the second compartment may retain the same or different liquid substances. In still other embodiments, the neck portion may comprise greater or fewer openings and the chamber portion may have greater or fewer compartments. In these embodiments wherein the neck portion comprises more than one opening and the chamber portion comprises more than one compartment, it is contemplated that the dispensing member may have an equivalent and corresponding quantity of each of the dispenser heads, the pumps, and the dip tubes.

One or more of the above-disclosed embodiments, in addition to certain alternatives, are provided in further detail below with reference to the attached figure. The disclosed subject matter is not, however, limited to any particular embodiment disclosed.

Figure 1:
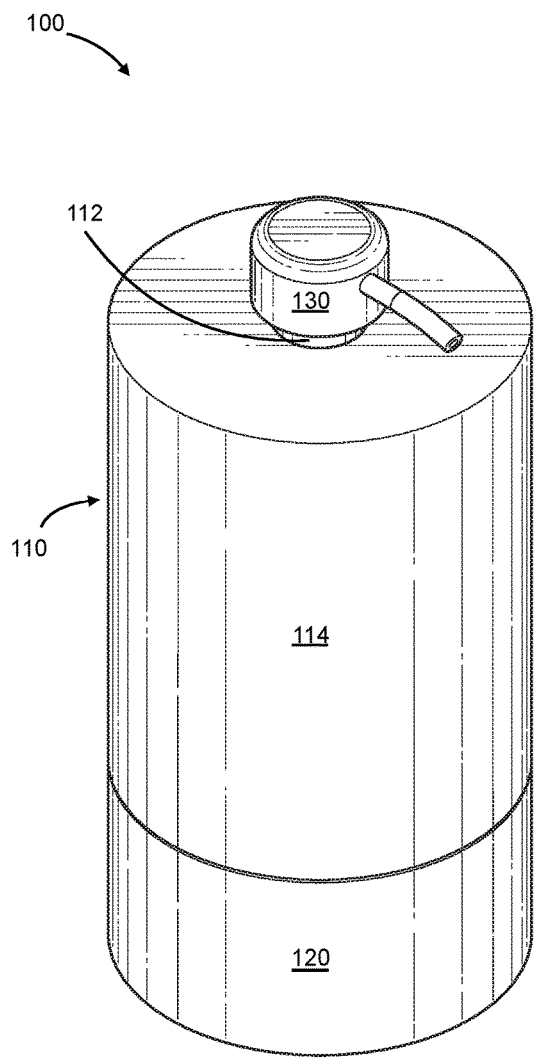
FIG. 1 shows a perspective view of a liquid dispensing system and apparatus in accordance with an embodiment of the invention.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

FIG. 1 is illustrative of a perspective view of a liquid dispensing system and apparatus in accordance with one embodiment of the invention. In some embodiments, the liquid dispensing system and apparatus 100 may comprise a container 110 configured to retain a liquid and may have a neck portion 112 and a chamber portion 114 disposed below the neck portion 112 and having a tapered portion; a base 120 configured to secure the container 110; and a dispensing member 130 configured to deliver liquid from the container 110.

Figure 2:
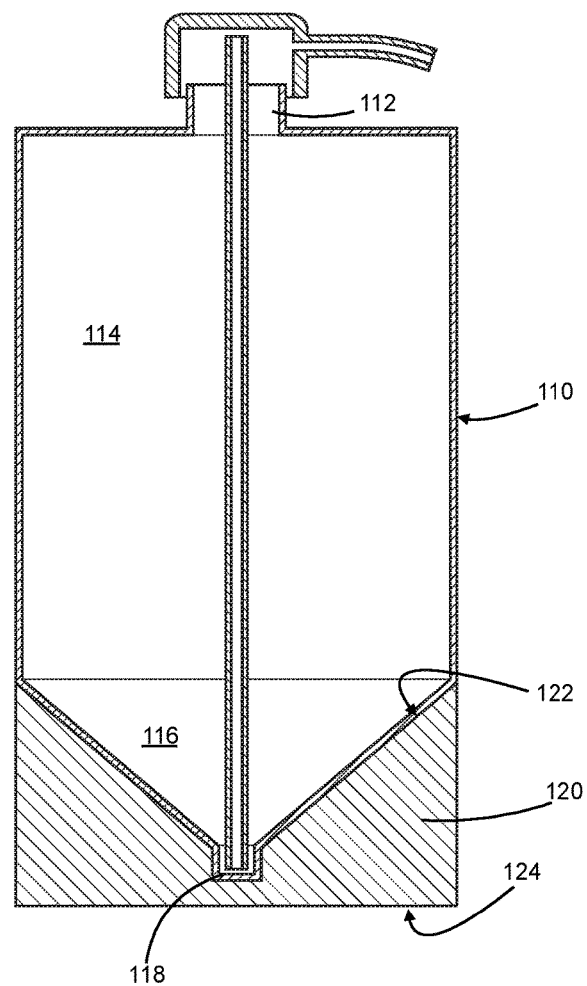
FIG. 2 shows a front cross-sectional view of a liquid dispensing system and apparatus in accordance with an embodiment of the invention.

With reference now to FIG. 2, a front cross-sectional view of an embodiment of the liquid dispensing system and apparatus is depicted. The base 120 may be configured to secure and support the container 110. In some embodiments, the container 110 and the base 120 may form one contiguous body. In other embodiments, the base 120 may be configured to removably secure the container 110. In such embodiments, the base 120 may further comprise an upper surface 122 and an opposing bottom surface 124. The upper surface 122 may be configured as the negative of the tapered portion 116 of the chamber 114. Moreover, the upper surface 122 may have one or more fitting means capable of engaging with the container 110, such as one or more threaded elements. In other embodiments, the fitting means may be one or more friction-based snap-connect elements. One of ordinary skill in the art will recognize other types of fitting means are available to removably secure the container 110 to the upper surface 122 of the base 120.

Figure 6:
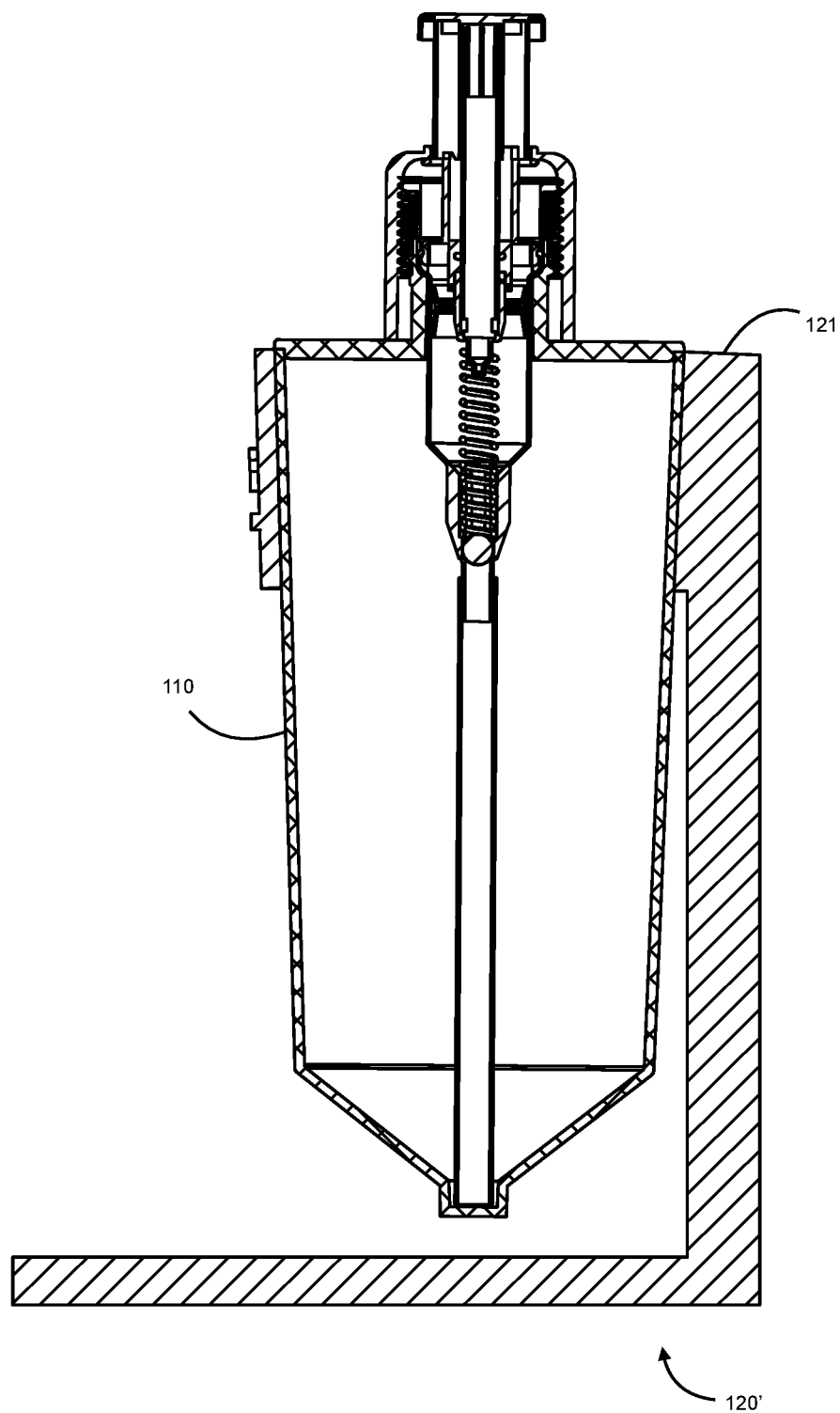
FIG. 6 shows a cross-sectional view of a liquid dispensing system and apparatus in accordance with an embodiment of the invention.

The base 120 may be configured to support the container 110 in an upright position on a horizontal or vertical surface. In embodiments wherein the base 120 rests on a horizontal surface, the bottom surface 124 may have one or more legs. In alternate embodiments, the bottom surface 124 may be flat so as to directly contact the horizontal surface, such as a table or countertop. In embodiments, an alternative base 120' may be configured to support the container 110 along a vertical surface, as shown in FIG. 6. In such cases, the base 120' may further comprise mounting means, such as a supportive arm 121, suction cups, or a stand extending from the vertical surface.

Returning to FIG. 2, in some embodiments, the base 120 may be shaped as a rectangular prism, cuboid, or cylinder. In still other embodiments, the base 120 may be spherical and the bottom surface 124 may be flat, thereby allowing the base 120 together with the container 110 to rest on a horizontal surface. A person of ordinary skill in the art will understand that the base 120 may be formed into virtually any shape capable of securing and supporting the container 110 on a surface. Moreover, the base 120 may be shaped so as to correspond with the shape of the container 110. In other embodiments, the base 120 may be larger relative to the container 110. In alternate embodiments, the base 120 may be smaller relative to the container 110.

The container 110 may be further defined by the neck portion 112 and the chamber portion 114. In certain embodiments, the chamber portion 114 may be defined as a compartment for retaining liquid. The chamber portion 114 may be of any shape capable of retaining a liquid, such as, by way of illustration and not limitation, a cylinder, a rectangular prism, a cuboid, a sphere, or a bulbous shape. In some embodiments, and as shown in the FIGS., the neck portion 112 may have a diameter that is smaller relative to the diameter of the chamber portion 114. In other embodiments, the neck portion 112 may have a diameter that is equivalent to the diameter of the chamber portion 114.

The chamber portion 114 may further comprise a tapered portion 116, wherein the tapered portion 116 may be configured to terminate in a lowest point 118. The lowest point 118 may be configured as a collection point for liquid stored in the chamber portion 114. In some embodiments, the tapered portion 116 may be shaped as an inverted hollow cone, wherein the lowest point 118 may be the cone's point. In alternate embodiments, the tapered portion 116 may be shaped as a cylinder. A person of ordinary skill in the art will recognize the tapered portion 116 may be formed into any number of shapes in accordance with the present invention.

Figure 3:
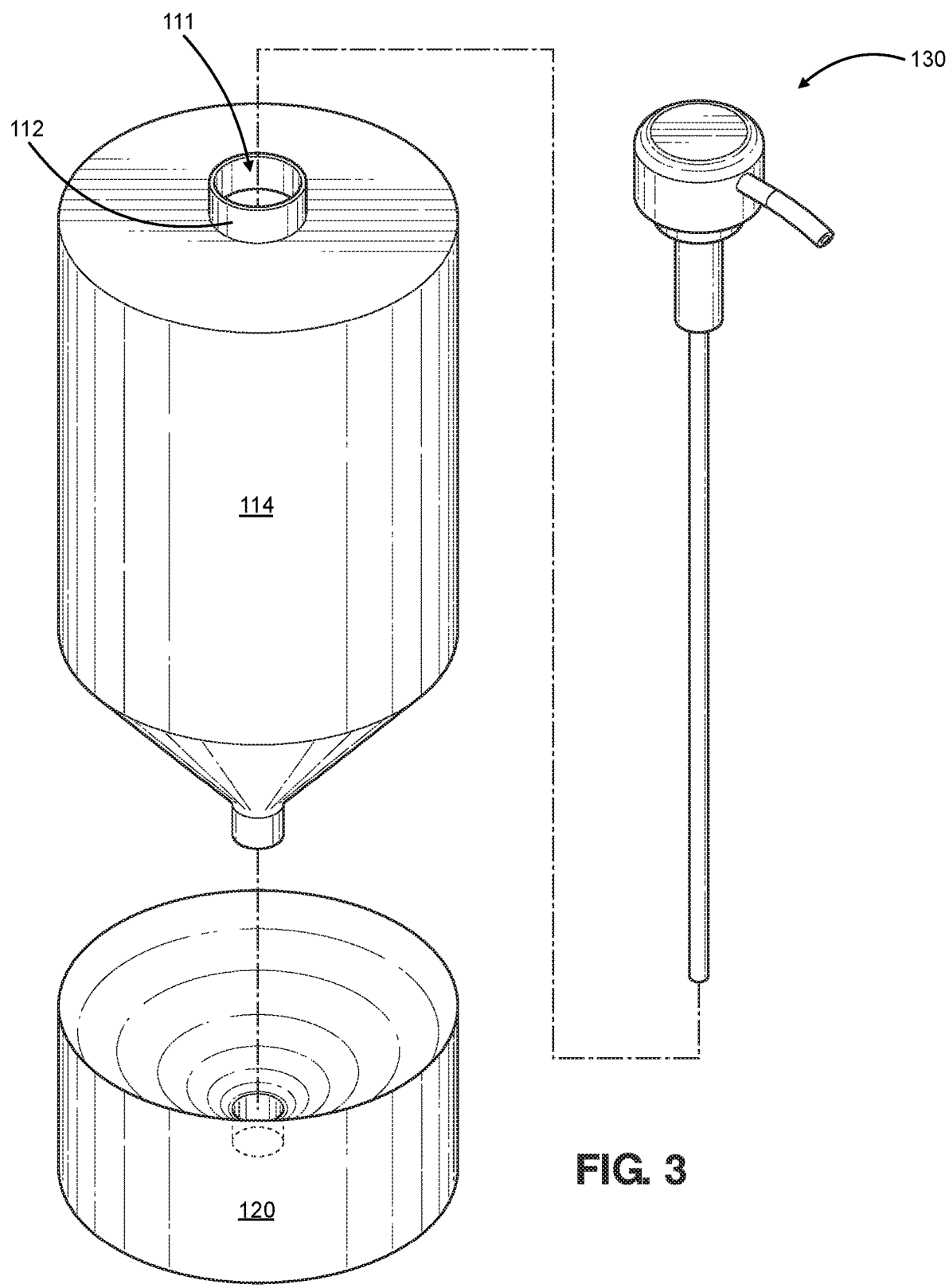
FIG. 3 shows an exploded view of a liquid dispensing system and apparatus in accordance with an embodiment of the invention.

In some embodiments, and as depicted in FIG. 3, the neck portion 112 may have an opening 111 configured to mate with and receive the dispensing member. Indeed, the neck portion 112 may have one or more mating elements, such as, one or more threaded elements or friction-based snap-connect elements. In such embodiments, the dispensing member may also have one or more mating elements compatible with and capable of securably engaging with the one or more mating elements of the neck portion 112. The opening 111 may also provide access to the chamber portion 114.

The chamber portion 114 and the neck portion 112 may be made of any material capable of withstanding contact with the selected liquid. By way of example and not limitation, the chamber portion 114 and the neck portion 112 may be made of polyolefins, such as polyethylene, or polyesters, such as polyethylene terephthalate. A person of ordinary skill in the art will understand that the chamber portion 114 and the neck portion 112 may be formed out of a variety of other materials capable of contacting the liquid. Further, in some embodiments, the chamber portion 114 and the neck portion 112 may be formed out of a material not capable of withstanding contact with the selected liquid and therefore, may be coated with a protective coating to avoid chemical reaction with the liquid.

Figures 4, 5:
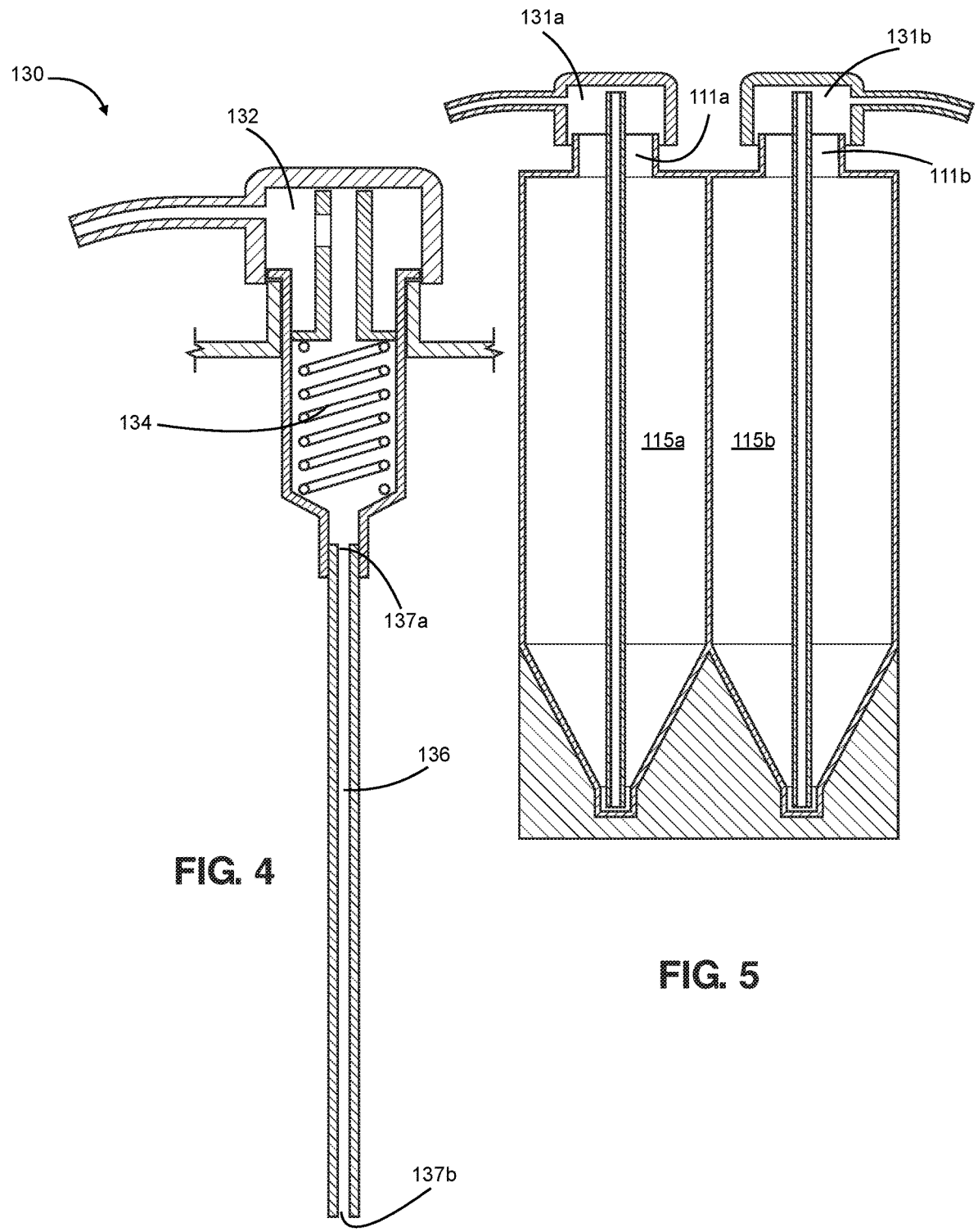
FIG. 4 shows a cross-sectional view of a dispensing member of a liquid dispensing system and apparatus in accordance with an embodiment of the invention.
FIG. 5 shows a cross-sectional view of a liquid dispensing system and apparatus in accordance with an embodiment of the invention.

An embodiment of the dispensing member 130 is shown in a cross-sectional view in FIG. 4. The dispensing member 130 may comprise a standard or commercially produced pump action dispenser known to those skilled in the art. The dispensing member 130 may be configured to securably mate with the neck portion, as discussed above. Indeed, an interior side of the dispensing member 130 may have one or more mating elements, such as threaded elements or friction-based snap-connect elements, which may be configured to engage with the mating elements of the neck portion. In other embodiments, the dispensing member 130 may rest on or around the neck portion without securing thereto. In still other embodiments, the dispensing member 130 may be sealed to the neck portion. The dispensing member 130 may further comprise at least one dispenser head 132, at least one pump 134, and at least one dip tube 136.

The dip tube 136 may be configured to extend toward the lowest point of the tapered portion. In some embodiments, the dip tube 136 is formed as a hollow cylinder with openings on either end. In other embodiments, the dip tube 136 may be formed as other hollow shapes with two openings on either end. Indeed, the dip tube 136 may further comprise an upper terminus 137a and a lower terminus 137b. The lower terminus 137b may contact the lowest point so as to retrieve liquid therefrom. In some embodiments, the lower terminus 137b may be angled. In other embodiments, the lower terminus 137b may be shaped as a flat, blunt edge. One of ordinary skill in the art will recognize the lower terminus 137b may be variously shaped so as to maximize its ability to make contact with and retrieve the liquid collected at the lowest point. The upper terminus 137a may be integrally connected with the dispensing member 130. In other embodiments, the upper terminus 137a may be removably connected to the dispensing member 130.

In some embodiments, the dip tube 136 may be made of a flexible plastic or any other suitable, flexible material. In other embodiments, the dip tube 136 is made of a rigid plastic or any other suitable, rigid material, such as metal or glass. A person of ordinary skill in the art will understand the dip tube 136 may be formed out of any material capable of withstanding contact with the selected liquid. Moreover, in certain embodiments, the dip tube 136 may be formed out of a material not capable of withstanding contact with the selected liquid and may therefore be coated with a protective coating to avoid chemical reaction with the liquid.

It is further contemplated that the dispensing member 130 may have the pump 134 and the dispenser head 132. The pump 134 may be configured to cause the liquid retained in the chamber portion to be emitted through the dispenser head 132, such as through utilization of a spring-powered vacuum. Indeed, when the dispenser head 132 is depressed, the pump 134 may be configured to draw liquid into the lower terminus 137b of the dip tube 136 and ultimately, emit the liquid through the dispenser head 132. A person of ordinary skill in the art will recognize that the pump 134 may be formed as any device capable of being inserted into the dispensing member 130 and causing the dispensing of liquid therefrom.

The dispenser head 132 may be configured to control dispensing of liquid from the container 110. In certain embodiments, the dispenser head 132 is integrally connected with the pump 134. In other embodiments, the dispenser head 132 may be separable from the pump 134. The dispenser head 132 may further comprise a nozzle configured to deliver liquid as a spray, single shot, pool, mist, foam, or atomized, as appropriate for the type and viscosity of the liquid. It is contemplated by this invention that the liquid may be that of a lotion, gel, cream, or other composition. For example, the liquid may be shampoo, conditioner, body lotion, liquid soap, rubbing alcohol, or facial cleanser. As another example, the liquid may be a food product, such as olive oil, vinegar, ketchup, mustard, mayonnaise, or salad dressing. It is to be understood that the invention may be adapted to retain and dispense virtually any type of liquid.

In certain embodiments, the dispensing member 130 may also have a pump actuation block to prevent the undesirable delivery of liquid from the dispenser head 132. Such pump actuation block may provide a locking mechanism and a sealing mechanism. For example, the pump actuation block may be engaged by rotating the dispenser head 132 to a locked position so as to disallow depression of the dispenser head 132 and subsequent release of liquid therefrom. The pump actuation block may thereby prevent inadvertent release or accidental spills of liquid retained in the container.

In some embodiments, and as shown in FIGS. 1 through 4, the neck portion 112 may have exactly one opening and the chamber portion 114 may be defined as exactly one compartment. Alternatively, the neck portion 112 may comprise more than one opening and the chamber portion 114 may be defined as more than one compartment. Indeed, as illustrated in FIG. 5, the neck portion 112 may have two corresponding openings, that is, a first opening 111a and a second opening 111b. In such embodiments, the chamber portion 114 may be defined as two compartments, that is, a first compartment 115a and a second compartment 115b, each of the first and second compartments 115a, 115b corresponding to the first and second openings 111a, 111b, respectively. In certain embodiments, the first compartment 115a may retain the same liquid as the second compartment 115b. In alternate embodiments, the first compartment 115a may retain a different liquid from that retained in the second compartment 115b. In embodiments wherein the neck portion 112 comprises a first and second opening 111a, 111b and the chamber portion 114 comprises a first and second compartment 115a, 115b, there may be two corresponding dispensing members, that is, a first dispensing member 131a and a second dispensing member 131b. In embodiments wherein the neck portion 112 comprises more than two openings and the chamber portion 114 comprises more than two compartments, it is contemplated that there may also be an equivalent and corresponding quantity of dispensing members.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Moreover, insofar as the description above and the accompanying drawing disclose any additional subject matter that is not within the scope of the single claim below, the inventions are not dedicated to the public and the right to file one or more applications to claim such additional inventions is reserved.

Conclusions, Ramifications, and Scope

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed present invention. The above description of embodiments of the present invention is not intended to be exhaustive or limited to the precise form disclosed above or to a particular field of usage.

While specific embodiments of, and examples for, the present invention are described above for illustrative purposes, various equivalent modifications are possible for which those skilled in the relevant art will recognize.

While certain aspects of the present invention are presented below in particular claim forms, various aspects of the present invention are contemplated in any number of claim forms. Thus, the inventor reserves the right to add additional claims after filing the application to pursue such additional claim forms for other aspects of the present invention.

What is claimed is:

1. A liquid dispensing system comprising:
a container having a neck portion and at least one chamber portion, wherein the neck portion has at least one opening, and wherein the chamber portion is configured to retain a liquid and has at least one tapered portion, and wherein the tapered portion is configured to terminate in a lowest point;
a dispensing member configured to securably mate with the neck portion, and having at least one dispenser head, at least one pump, and at least one dip tube, wherein the dip tube is configured to extend to the lowest point; and
a base configured to secure the container, wherein the container and the base are configured as one contiguous body, and wherein the base is configured to receive mounting means to support the container in an upright position on a vertical surface, and wherein the mounting means is a supportive arm, one or more suction cups, or a stand extending from the vertical surface.

2. A liquid dispensing apparatus, comprising
a container, comprising
a neck portion having at least one opening;
a chamber portion, disposed below the neck portion and configured to retain liquid;
a tapered portion configured to terminate in a lowest point;
a dispensing member configured to securably mate with the neck portion, and comprising
at least one dispenser head configured to dispense liquid from the chamber portion;
at least one pump,
at least one dip tube configured to extend to the lowest point; and
a base configured to secure the container;
wherein the base is configured to receive mounting means to support the container in an upright position on a vertical surface, and wherein the mounting means is a supportive arm, one or more suction cups, or a stand extending from the vertical surface.

* * * * *